United States Patent
Wei et al.

(10) Patent No.: US 11,106,550 B2
(45) Date of Patent: *Aug. 31, 2021

(54) BLOCK STORAGE RELOCATION ON FAILURE

(71) Applicant: Amazon Technologies, Inc., Reno, NV (US)

(72) Inventors: Danny Wei, Seattle, WA (US); Shiow-wen Wendy Cheng, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/415,898

(22) Filed: May 17, 2019

(65) Prior Publication Data
US 2019/0272222 A1    Sep. 5, 2019

Related U.S. Application Data

(63) Continuation of application No. 15/620,478, filed on Jun. 12, 2017, now Pat. No. 10,372,561.

(51) Int. Cl.
| | |
|---|---|
| *G06F 11/00* | (2006.01) |
| *G06F 11/16* | (2006.01) |
| *G06F 12/1009* | (2016.01) |
| *G06F 12/1072* | (2016.01) |
| *G06F 11/10* | (2006.01) |

(52) U.S. Cl.
CPC ...... *G06F 11/1662* (2013.01); *G06F 11/1088* (2013.01); *G06F 12/1009* (2013.01); *G06F 12/1072* (2013.01); *G06F 2201/805* (2013.01); *G06F 2201/82* (2013.01); *G06F 2201/85* (2013.01); *G06F 2212/1032* (2013.01); *G06F 2212/154* (2013.01); *G06F 2212/651* (2013.01)

(58) Field of Classification Search
CPC ............ G06F 11/1662; G06F 12/1009; G06F 12/1072

See application file for complete search history.

(56) References Cited

U.S. PATENT DOCUMENTS

| | | |
|---|---|---|
| 8,010,829 B1 | 8/2011 | Chatterjee |
| 10,146,459 B1 | 12/2018 | Gao |

(Continued)

OTHER PUBLICATIONS

Non-Final Rejection issued in U.S. Appl. No. 15/620,478 dated Dec. 19, 2018.

(Continued)

*Primary Examiner* — Joshua P Lottich
(74) *Attorney, Agent, or Firm* — Hogan Lovells US LLP

(57) ABSTRACT

A failure of a storage device used to provide a mirrored storage volume can be managed without a full re-mirroring of the volume. The volume can be provided using a set of similar storage devices on each of a master server and a slave server, and a technique such as data striping can be used to store the data for the volume across the various devices. When a storage device becomes unavailable, the data from the corresponding storage device on the other mirrored server can be written to the remaining storage devices on the server experiencing the device failure. The data interface can be virtualized such that the user can continue to send input and output (I/O) requests using the same address information. A translation layer can map the virtualized addresses to the physical addresses where the data is stored.

20 Claims, 8 Drawing Sheets

(56) References Cited

U.S. PATENT DOCUMENTS

| | | |
|---|---|---|
| 10,175,888 B2 | 1/2019 | Agombar |
| 2007/0079105 A1 | 4/2007 | Thompson |
| 2007/0088990 A1 | 4/2007 | Schmitz |
| 2010/0077252 A1 | 3/2010 | Siewert |
| 2010/0251012 A1 | 9/2010 | Zwisler |
| 2012/0226853 A1 | 9/2012 | Bert |
| 2015/0331807 A1 | 11/2015 | Lie |
| 2017/0269862 A1 | 9/2017 | Agombar |
| 2017/0270002 A1 | 9/2017 | Gao et al. |
| 2017/0315745 A1 | 11/2017 | Agombar |

OTHER PUBLICATIONS

Notice of Allowance issued in U.S. Appl. No. 15/620,478 dated Mar. 28, 2019.

BLOCK STORAGE RELOCATION ON FAILURE

CROSS REFERENCE TO RELATED APPLICATION

This application is a Continuation of, and accordingly claims the benefit of, U.S. patent application Ser. No. 15/620,478 filed with the U.S. Patent and Trademark Office on Jun. 12, 2017, which is hereby incorporated herein by reference.

BACKGROUND

As an increasing number of applications and services are being made available over networks such as the Internet, an increasing number of content, application, and/or service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In such an environment, a customer might write data to a block storage system, where the data may be redundantly stored across multiple disks. In conventional systems, the failure of a disk drive on a server would result in the entire server being taken offline, which requires all the data written to the disks on that server to be replicated to a new server from a slave copy. This generation of a completely new data set is very resource intensive and takes a significant amount of time, and is prone to errors in the replication process.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to managing storage resources in an electronic environment. In particular, various approaches provide for the recovery from an unavailability of a storage device used to provide a mirrored storage volume. The storage volume can be provided using a set of storage devices on each of a master server (or host) and a slave server. A data storage technology such as a redundant array of independent disks (RAID)-based approach can be used to store the data for the volume across the respective sets. When a storage device on the master server becomes unavailable (or otherwise experiences an issue wherein it is determined to no longer use that device for storage), the data corresponding to the unavailable device can be retrieved from the slave server and written to some, or all, of the remaining storage devices on the master server. The slave copy can be a mirrored copy or a redundant copy, where the data may be written in corresponding locations or other locations on corresponding devices or other devices, or combinations of devices, on the slave server. The user or client device does not have to manage the locations for this data, because the data addresses can be virtualized such that the user can continue to send input and output (I/O) requests using the same address information. A mapping or translation layer can be maintained that maps the virtualized addresses to the physical addresses where the data is stored on the master server, such that the data can be accessed from its actual storage location. A similar process can be used for failure of a storage device on the slave server, wherein the redundant copy of the data from the failed device can be written across the remaining slave devices and the address information virtualized and mapped using an address translation layer.

Various other such functions can be used as well within the scope of the various embodiments as would be apparent to one of ordinary skill in the art in light of the teachings and suggestions contained herein.

Figure 1A:
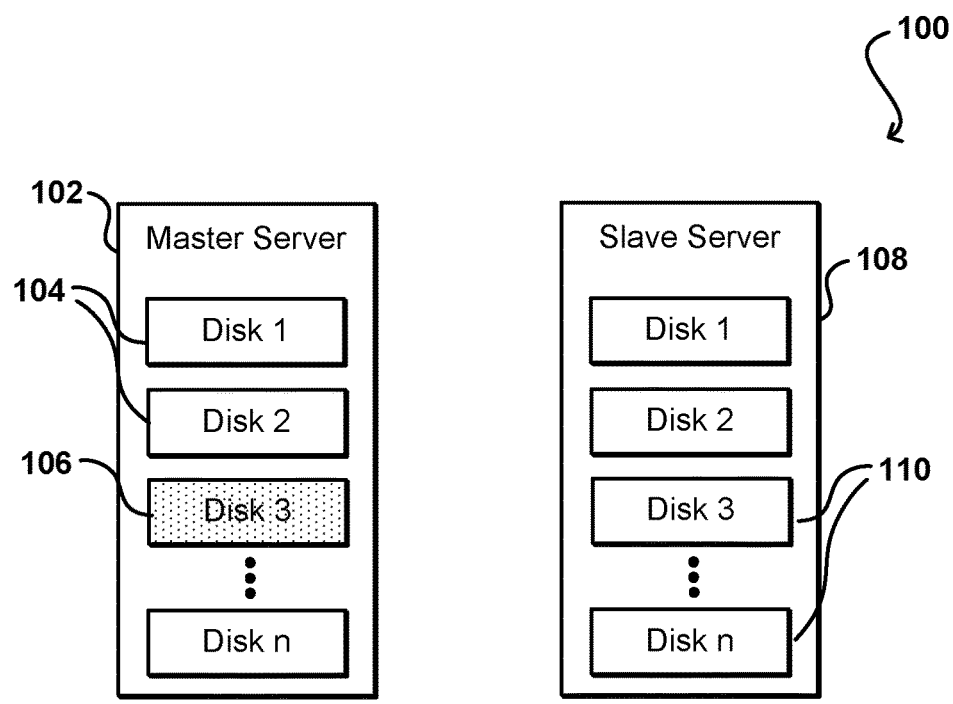
FIGS. 1A and 1B illustrate an example failure recovery approach that can be utilized in accordance with various embodiments.
Figure 1B:
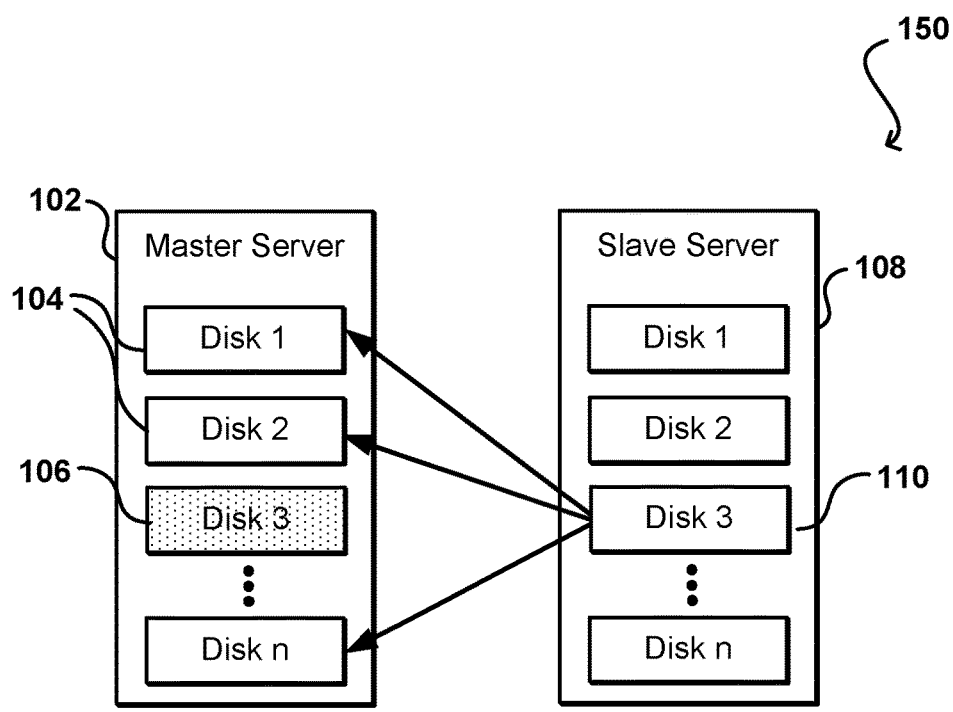

FIGS. 1A and 1B illustrate an example failover approach that can be utilized in accordance with various embodiments. In the configuration 100 of FIG. 1A, a master server 102 containing a number of storage drives 104, such as solid state devices or magnetic disk drives, can store data for one or more customers across one or more storage volumes. The server can be any appropriate server as known or used for such purposes, and there can be any appropriate number of storage drives in the server, such as sixteen drives in one embodiment. While solid state devices (SSDs) are discussed in various embodiments, it should be understood that other types of storage can be utilized as well, as may include magnetic disk storage, optical storage, magnetic tape storage, and the like. In this example, the data for a customer is written to a data volume that spans multiple disks 104, 106 on the master server 102. A replica of the data is then created using disks 110 of a slave server 108. This can be a mirrored replica, where data is stored to the same locations on corresponding devices of both servers, or can include a non-mirrored replica whereby the data is stored to the slave host in a way that is appropriate for the slave host and then mapped to the corresponding locations on the master host. In this example, a disk striping approach such as RAID-0 can be used to distribute the data across the disks in a RAID group. For a new server, a first data stripe can be written to a first disk, with a second stripe to a second disk and so on, until writing to the last disk in the RAID group, after which the next stripe is again written to the first disk, and so on. Benefits of data striping include the spreading of data across multiple disks, such that much of the data is able to be recovered in the event of a failure of one disk. Further, the ability to write concurrently to multiple disks enables write operations to be performed more quickly than when using a single drive. A downside to a RAID-0 striping approach is that it does not have redundancy, such that if one of the disks on the master fails there is no way to recover the data from using the remaining data on the master. Accordingly, a slave copy is generated using the disks of the slave server 108 such that if one of the master disks fails then that data can be recovered from the corresponding slave drive.

In conventional approaches, the failure of one of the disks, such as disk three of eighteen, on a master server 102 would result in the master being taken offline and the slave server 108 being designated as the new master server. An additional server would then have a copy of the data stored from the slave server 108 (now the master) to a corresponding set of disks in order to function as a new slave server, where the data striped across the various disks would be written in the same order and location to form a mirrored copy. This can be very time and resource intensive, however, as all the data for the large volume must be copied over, while either not accepting new writes or handling writes that are received and processed during the creation of the new, mirrored slave volume. Further, such an approach can waste resources as the entire master server becomes unavailable until such time as the failed drive can be repaired or replaced. Further still, additional servers must be available at any time to function as a new slave, resulting in significant unused capacity in the resource provider environment.

Approaches in accordance with various embodiments can attempt to take advantage of the fact that the failure of a single drive (or other storage device, such as an SSD) on a server still leaves several functioning drives on that server, within a RAID group and supporting a storage volume. In the example configuration 150 of FIG. 1B, the third disk 106 in the group has failed on the master server 102, but the third disk 110 (or other disk(s) storing the corresponding data) on the slave server 108 still contains a copy of the data that would otherwise have been lost or unavailable due to the failure. Accordingly, the data from the corresponding slave disk(s) 110 can be written back across some or all of the remaining active disks 104 of the master server 102. In this way, the master will have a full and accurate copy of the data even though one of the disks is no longer available. A similar process can occur in the event of the loss of multiple drives, assuming there is sufficient remaining storage on the master server 102 to store the full volume. There may be capacity or storage minimum thresholds below which a new mirrored copy is generated or the volume is split over multiple servers, among other such options.

An issue arises, however, in the fact that the storage client, such as a block storage client, will still want to read and write data using the prior RAID stripe information. While adjustment might be possible in some instances, some block storage clients may require usage of conventional RAID stripe addresses. Accordingly, approaches in accordance with various embodiments can virtualize the block addresses or interface such that those addresses can still be used to access the data, even though the addresses do not correspond to actual physical addresses on the storage devices. In at least one embodiment, a translation table can be generated that maps the virtual RAID addresses to physical addresses on the actual disk drives. In this way, the storage client can continue to use the same RAID addresses to read and write the data to the customer data volume, but the addresses can be translated into the actual physical addresses such that the corresponding data can be located and processed.

In one embodiment, the storage block addresses are visualized in part by building a thin translation layer, or updating an existing mapping layer, to convert the virtual block address, known to the server daemon, to the actual block address known to the RAID-0 interface. Such an approach can enable access to the data, as well as the dynamic placement of stripes or groups of blocks amongst the various drives. An example translation table can include entries on the I/O loads for movement scheduling. New stripe mapping can be performed based upon a number of different criteria, as may include first-found-least-load or next-to-buddy-stripe, among others. Upon a read request, a shared range lock can be taken in some embodiments. The byte-addressable range, matching an actual I/O request, can include a subset of the stripe or the entire stripe itself. If the disk that hosts the stripe is identified as unavailable or slow, for example, the shared range lock can be upgraded to an "Exclusive Stripe Shared" lock, or other such option. The stripe can be read from the paired slave host or server. The data for the request can subsequently be returned to the caller, while the execution unit (e.g., thread) waits for the new write to complete. Before the lock is released, all reads into this stripe range can be allowed, and a write can be allowed if the byte range data has been read in from the slave copy. In other embodiments, instead of implementing a lock the system can instead pull the appropriate data before performing a remapping, among other such options.

The flow for a write operation can be similar in at least some embodiments. For example, an exclusive lock range can be taken upon request. The byte-addressable range can be a subset of the stripe or the entire stripe itself. If the disk that hosts the stripe is identified as unavailable or slow, for example, the range lock is upgraded into a "Restricted Stripe Write" lock or similar option. The user data can be written as usual, with an acknowledgement sent back to the caller. A remainder of the stripe data can subsequently be read from the paired slave, followed by a write to the local alternative disk. Before the lock is released, all reads into the stripe fir other than the user write range can be allowed, and a write can be allowed if the byte range data has been read in from the appropriate slave.

Such an approach can provide a tradeoff in storage capacity degradation that can be reasonably mitigated, and can have advantages over conventional excessive re-mirroring activities. For example, approaches discussed herein can have a reduced wear-out rate than conventional approaches, and can provide for less re-mirroring which can avoid much of the associated latency degradation. A significant advantage relates to a reduction in the full failover overhead that involves the complication of storage client handshaking, location of a suitable new slave server, and most the re-mirroring of the otherwise healthy disks. In some embodiments, a local re-mirroring can be scheduled to pull the data from master in the event of a slow broken drive on the slave server.

Figure 2:
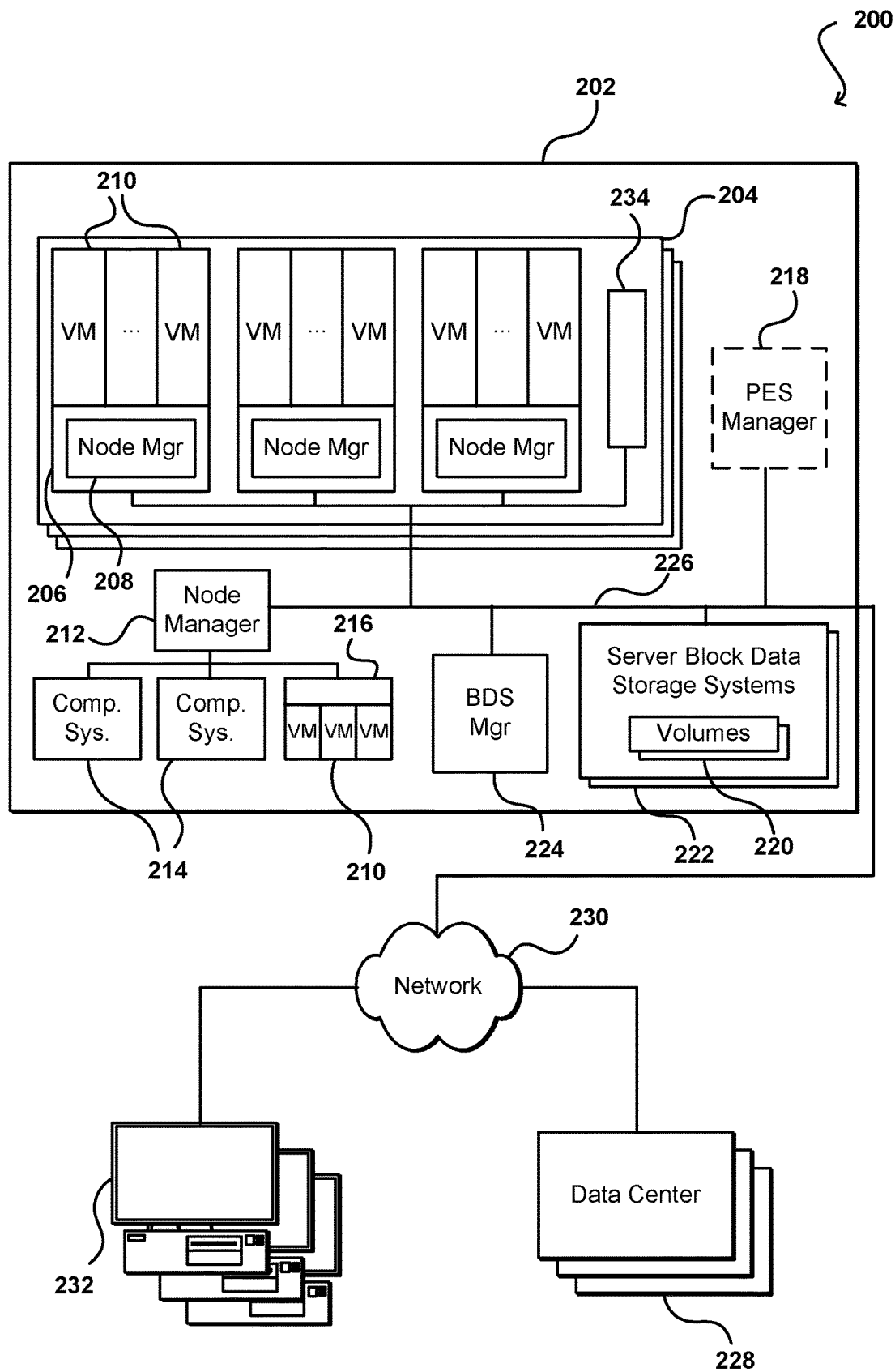
FIG. 2 illustrates an example system architecture that can be used to implement aspects of the various embodiments.

FIG. 2 illustrates an example network configuration 200 in which multiple computing systems are operable to execute various programs, applications, and/or services, and further operable to access reliable non-local block data storage, such as under the control of a block data storage service and/or program execution service, in accordance with various embodiments. In particular, in this example, a program execution service manages the execution of programs on various host computing systems located within a data center 202, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

Systems and methods in accordance with various embodiments are operable to manage access to resources such as data storage and data servers. In at least some embodiments, these approaches include providing a block data storage service that uses multiple server storage systems to reliably store block data that may be accessed and used over one or more networks by any of various users, applications, processes, and/or services. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more block data service manager modules. For example, a first user who is a customer of the block data storage service may create a first block data storage volume, and execute one or more program copies on one or more resource nodes that are instructed to access and use the first volume (e.g., in a serial manner, in a simultaneous or other overlapping manner, etc.). When an application executing on a resource node initiates use of a non-local volume, the application may mount or otherwise be provided with a logical block data storage device that is local to the resource node and that represents the non-local volume, such as to allow the executing program to interact with the local logical block data storage device in the same manner as any other local hard drive or other physical block data storage device that is attached to the resource node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or resource node) so as to perform the interactions on that stored volume copy on behalf of the executing program. Furthermore, in at least some embodiments, at least some of the described techniques for managing access of applications and services to non-local block data storage volumes are automatically performed by embodiments of a Node manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine resource nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the block data storage (BDS) manager, such as if one or more manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a block data storage manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the In the example of FIG. 2, a shared resource environment 202, such as may comprise a data center or service provider environment, includes a number of racks 204, each rack including a number of host computing devices 206, as well as an optional rack support computing system 234 in this example embodiment. The host computing systems 206 on the illustrated rack 204 each host one or more virtual machines 210 in this example, as well as a distinct Node manager module 208 associated with the virtual machines on that host computing system to manage those virtual machines. One or more other host computing systems 216 may also each host one or more virtual machines 210 in this example. Each virtual machine 210 may act as an independent resource node for executing one or more program copies (not shown) for a user (not shown), such as a customer of the program execution service, or performing another such action or process or user data requests, I/O operations, etc. In addition, this example data center 202 further includes additional host computing systems 214 that do not include distinct virtual machines, but may nonetheless each act as a resource node for one or more programs (not shown) being executed for a user. In this example, a Node manager module 212 executing on a computing system (not shown) distinct from the host computing systems 214 and 216 is associated with those host computing systems to manage the resource nodes provided by those host computing systems, such as in a manner similar to the Node manager modules 208 for the host computing systems 206. The rack support computing system 234 may provide various utility services for other computing systems local to its rack 202 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 218 is also illustrated that executes a program execution service (PES) manager module for the program execution service to assist in managing the execution of programs on the resource nodes provided by the host computing systems located within the data center (or optionally on computing systems located in one or more other data centers 228, or other remote computing systems 232 external to the data center). As discussed in greater detail elsewhere, a PES manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES manager module may coordinate with the node manager modules 208 and 212 to manage program execution on resource nodes associated with the node manager modules, while in other embodiments the node manager modules may not assist in managing such execution of programs.

This example the data center 202 also includes a computing system 224 that executes a block data storage ("BDS") system manager module for the block data storage service to assist in managing the availability of non-local block data storage to programs executing on resource nodes provided by the host computing systems located within the data center (or optionally on computing systems located in one or more other data centers 228, or other remote computing systems 232 external to the data center). In particular, in this example, the data center 202 includes a pool of multiple server block data storage systems 222, which each have local block storage for use in storing one or more volume copies 220. Access to the volume copies 220 is provided over the internal network(s) 226 to programs executing on various resource nodes 210 and 214. As discussed in greater detail elsewhere, a BDS manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS manager module may coordinate with the Node manager modules to manage use of volumes by programs executing on associated resource nodes, while in other embodiments the Node manager modules may not be used to manage such volume use. In addition, in other embodiments, one or more BDS manager modules may be structured in other manners, such as to have multiple instances of the BDS manager executing in a single data center (e.g., to share the management of non-local block data storage by programs executing on the resource nodes provided by the host computing systems located within the data center), and/or such as to have at least some of the functionality of a BDS manager module being provided in a distributed manner by software executing on some or all of the server block data storage systems 222 (e.g., in a peer to-peer manner, without any separate centralized BDS manager module on a computing system 224).

In this example, the various host computing systems, server block data storage systems, and computing systems are interconnected via one or more internal networks 226 of the data center, which may include various networking devices (e.g., routers, switches, gateways, etc.) that are not shown. In addition, the internal networks 226 are connected to an external network 230 (e.g., the Internet or other public network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 228 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 222 may further be interconnected with one or more other networks or other connection mediums, such as a high-bandwidth connection over which the server storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server block data storage systems and other devices may be much larger than what is depicted in FIG. 2. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many asسixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 3:
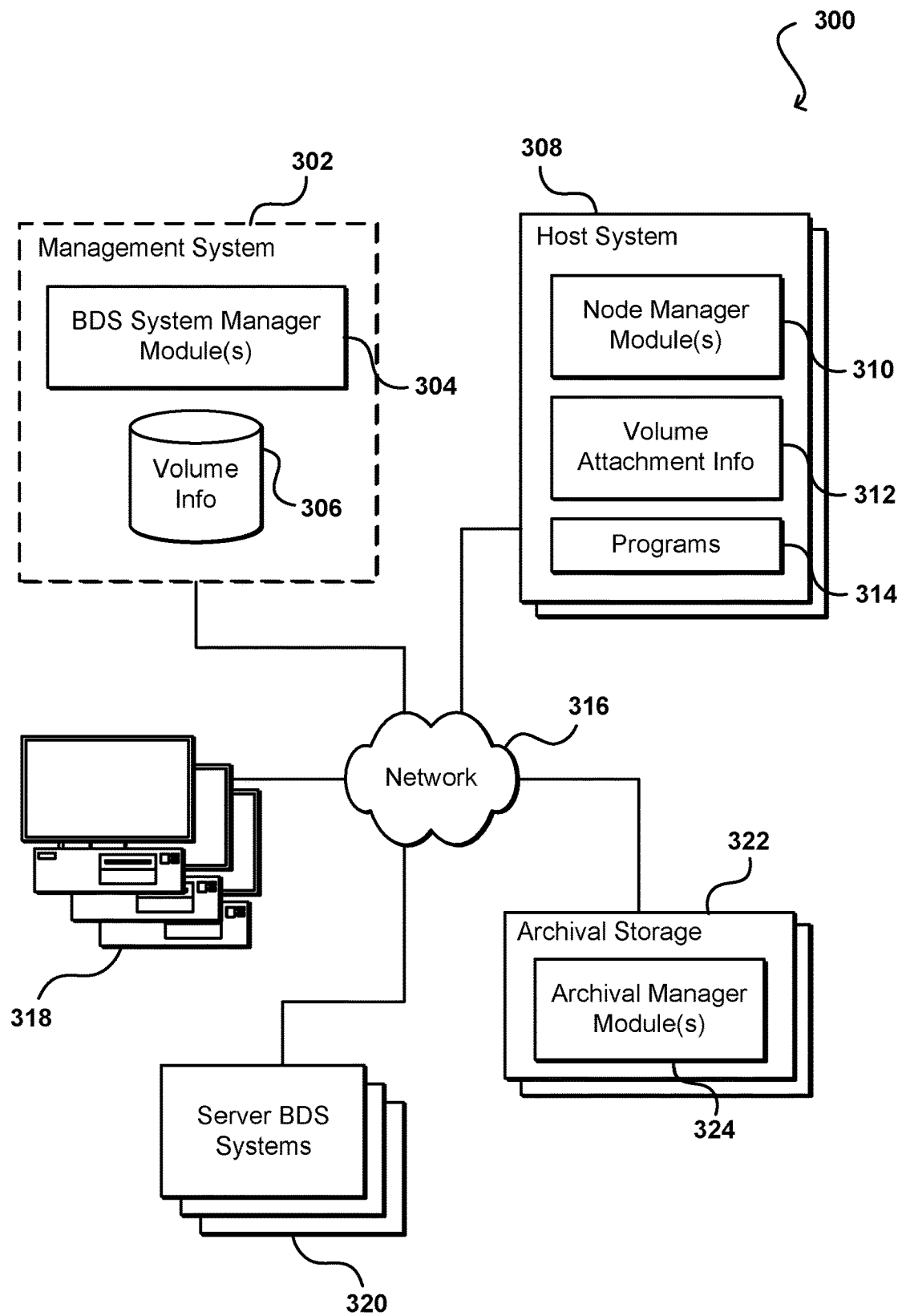
FIG. 3 illustrates an example separation of management and host components that can be used in accordance with various embodiments.

FIG. 3 illustrates an example environment 300 including computing systems suitable for managing the provision and use of reliable non-local block data storage functionality to clients that can be used in accordance with various embodiments. In this example, a management system 302, such as one or more server computers including one or more externally-facing customer interfaces, is programmed to execute an embodiment of at least one BDS manager module 304 to manage provisioning of non-local block data storage functionality to programs executing on host computing systems 308 and/or on at least some other computing systems 318, such as to block data storage volumes (not shown) provided by the server block data storage systems 320. Each of the host computing systems 308 in this example also executes an embodiment of a node manager module 310 to manage access of programs 314 executing on the host computing system to at least some of the non-local block data storage volumes, such as in a coordinated manner with the BDS manager module 304 over a network 316 (e.g., an internal network of a data center, not shown, that includes the computing systems 302, 308, 320, and optionally at least some of the other computing systems 318). In other embodiments, some or all of the Node manager modules 310 may instead manage one or more other computing systems (e.g., the other computing systems 318).

In addition, multiple server block data storage systems 320 are illustrated that each can store at least some of the non-local block data storage volumes (not shown) used by the executing programs 314, with access to those volumes also provided over the network 316 in this example. One or more of the server block data storage systems 320 may also each store a server software component (not shown) that manages operation of one or more of the server block data storage systems, as well as various information (not shown) about the data that is stored by the server block data storage systems. Thus, in at least some embodiments, the server computing system 302 of FIG. 3 may correspond to the computing system 124 of FIG. 1, one or more of the node manager modules 108 and 112 of FIG. 1 may correspond to the node manager modules 310 of FIG. 3, and/or one or more of the server block data storage computing systems 320 of FIG. 3 may correspond to server block data storage systems 122 of FIG. 1. In addition, in this example embodiment, multiple archival storage systems 322 are illustrated, which may store snapshot copies and/or other copies of at least portions of at least some block data storage volumes stored on the server block data storage systems 320. The archival storage systems 322 may also interact with some or all of the computing systems 302, 308, and 320, and in some embodiments may be remote archival storage systems (e.g., of a remote storage service, not shown) that interact with the computing systems over one or more other external networks (not shown).

The other computing systems 318 may further include other proximate or remote computing systems of various types in at least some embodiments, including computing systems via which customers or other users of the block data storage service interact with the management and/or host systems. Furthermore, one or more of the other computing systems 318 may further execute a PES System Manager module to coordinate execution of programs on the host computing systems 308 and/or other host computing systems 318, or the management system 302 or one of the other illustrated computing systems may instead execute such a PES System Manager module, although a PES System Manager module is not illustrated in this example.

In the illustrated embodiment, a node manager module 310 is executing in memory in order to manage one or more other programs 314 executing in memory on the computing system, such as on behalf of customers of the program execution service and/or block data storage service. In some embodiments, some or all of the computing systems 308 may host multiple virtual machines, and if so, each of the executing programs 314 may be an entire virtual machine image (e.g., with an operating system and one or more application programs) executing on a distinct hosted virtual machine resource node. The node manager module 310 may similarly be executing on another hosted virtual machine, such as a privileged virtual machine monitor that manages the other hosted virtual machines. In other embodiments, the executing program copies 314 and the Node manager module 310 may execute as distinct processes on a single operating system (not shown) executed on a single computing system 308.

The archival storage system 322 is operable to execute at least one archival manager module 324 in order to manage operation of one or more of the archival storage systems, such as on behalf of customers of the block data storage service and/or of a distinct storage service that provides the archival storage systems. In other embodiments, the archival manager module(s) 324 may instead be executing on another computing system, such as one of the other computing systems 318 or on the management system 302 in conjunction with the BDS manager module 304. In addition, while not illustrated here, in some embodiments various information about the data that is stored by the archival storage systems 322 may be maintained in storage for the archival storage systems or elsewhere.

The BDS manager module 304 and node manager modules 310 may take various actions to manage the provisioning and/or use of reliable non-local block data storage functionality to clients (e.g., executing programs), as described in greater detail elsewhere. In this example, the BDS manager module 304 may maintain a database 306 that includes information about volumes stored on the server block data storage systems 320 and/or on the archival storage systems 322 (e.g., for use in managing the volumes), and may further store various other information (not shown) about users or other aspects of the block data storage service. In other embodiments, information about volumes may be stored in other manners, such as in a distributed manner by node manager modules 310 on their computing systems and/or by other computing systems. In addition, in this example, each node manager module 310 on a host computing system 308 may store information 312 about the current volumes attached to the host computing system and used by the executing programs 314 on the host computing system, such as to coordinate interactions with the server block data storage systems 320 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 2 and 3 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 3, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 GB and 1 TB, in 1 GB increments. Components of the control plane, such as a BDS manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume may not be able to select or request a particular type of volume, or a particular level of performance A customer may be granted an amount of storage, and the performance can follow a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

A performance execution service or similar system can enable customers to obtain a minimum level of performance as specified by one or more service-level agreements (SLAs) provided for the service. In some embodiments a customer can purchase or obtain a specific type of storage offering, such as a type of storage volume, which can come with an associated SLA. For example, a standard volume might be offered at a first level that is supported by magnetic storage and offers a minimum performance guarantee, such as at least 10,000 input/output operations per second (IOPS) at up to a maximum workload with a maximum amount of latency. A higher performance volume might be offered at a second level that is supported by solid state device (SSD) storage and offers a higher minimum performance guarantee, such as at least 40,000 IOPS at up to a maximum workload with a maximum amount of latency. Other aspects may vary as well, as the latency for an SSD-based storage volume may be much less than for a magnetic storage (i.e., disk or tape storage) based volume, among other such aspects.

In some embodiments a block-based storage service (or other storage system or service) may offer a suite of storage products, as may include multiple types of storage volumes, each with different performance characteristics and/or guarantees. Due to the different performance guarantees, different types of hardware may be used to support different types of volumes. For example, magnetic storage might be used to support a lowest level of storage volume, while SSD-based storage might be used to support a middle level of storage volume and a highest level of storage volume that offers the highest level performance guarantees. Different levels of service and types of storage can be utilized as well within the scope of the various embodiments. The mapping between volume types and the hosts on which those volume types could be placed can be straightforward in such an embodiment, as it can be based strictly on the underlying type of hardware.

Figure 4:
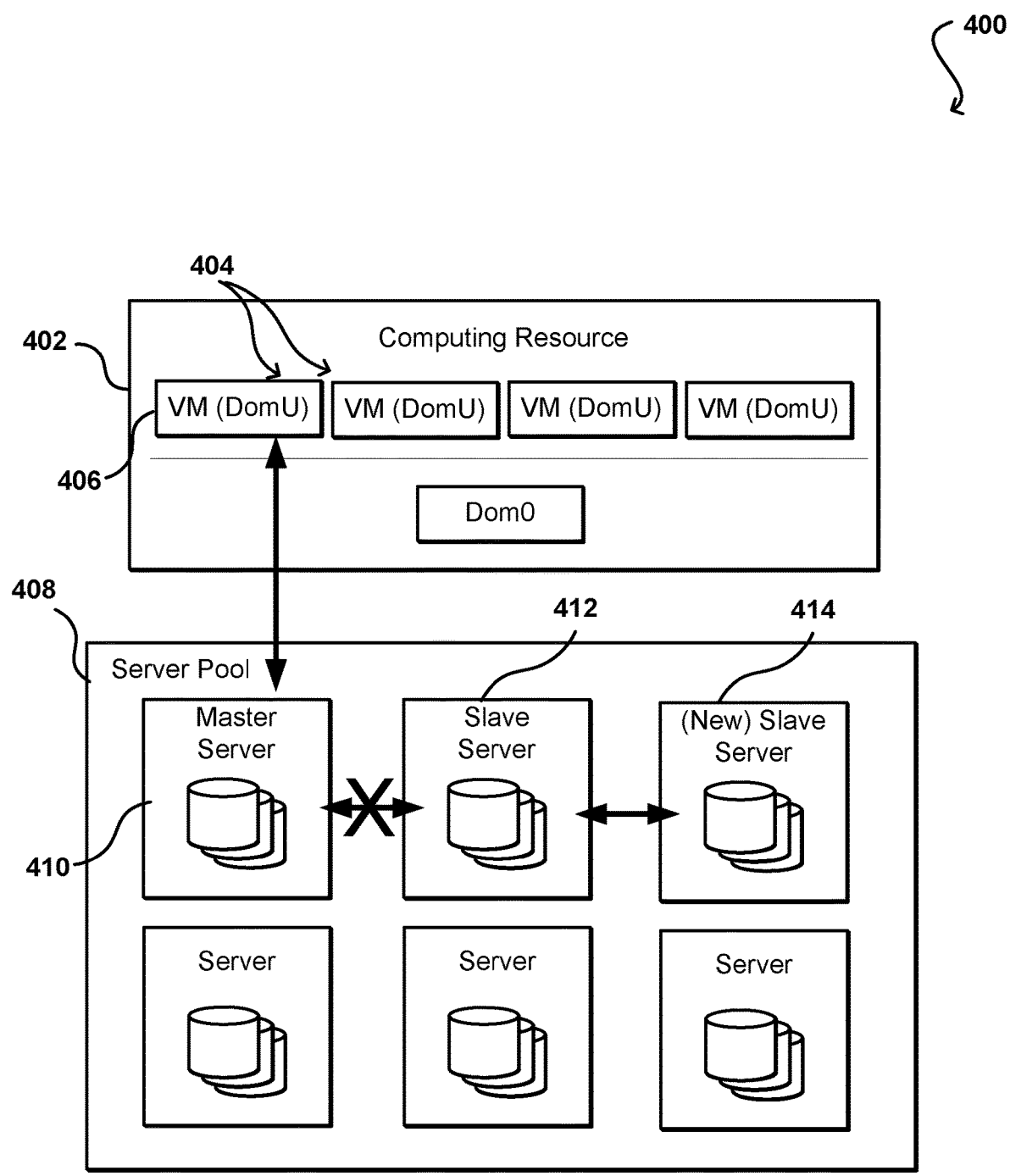
FIG. 4 illustrates an example failover approach that can be used in accordance with various embodiments.

As mentioned, in a conventional approach the storage for a customer in a cloud- or multi-tenant environment can include multiple physical disks that are configured as a RAID-0 volume within a storage server. As illustrated in the example configuration 400 of FIG. 4, two servers 410, 412 can be selected from a pool 408 of available server capacity to form a master-slave configuration. A computing resource 402, such as an application server, can host one or more virtual machines 404, for example, which can each submit read and write I/O requests with respect to servers in the server pool 408. A given virtual machine instance 406 can be associated with a customer, and requests from that instance can be received by a master server 410 for the corresponding data volume, which as mentioned may span multiple drives on the master server 410 using a RAID-0 or similar configuration. Using a conventional approach, a failure of one of the RAID disks on the server can cause the master server 410 as a whole to be taken offline, at least for I/O purposes. The former slave server 412 can then be designated as the new master server, such that I/O requests from the customer instance will be directed to the former slave server 412. Another server 414 from the server pool will then be selected as the new slave server. The new master 412 can then copy the RAID-0 contents, maintaining disk and stripe identification information, to the corresponding disks on the slave server 414. This process is generally referred to as re-mirroring.

In various embodiments, the disks on a server can be logically considered as a single storage device for purposes of storing a large, logically singular volume. Such a volume can be generated using Linux tool sets, for example, as may consist of eighteen solid state drives (SSDs), for example, with each SSD having 45 GB of storage space allocated with an 2 MB stripe size. Various other sizes and configurations can be used as well within the scope of the various embodiments. The servers in some embodiments can be operated under a mirror setup as discussed herein, while in other embodiments the servers can store the same data for a volume, or portions of a volume, but store the data in different locations. When one of the SSDs fails, the entire logical volume could be torn down and rebuilt. In such an approach the data from the other seventeen SSDs cannot be retrieved. As mentioned, this increases the chance of lost volumes, as well as the workload needed for re-mirroring.

In one conventional mirroring approach, the block storage I/O is initiated from user applications residing in the DomU of the corresponding virtual machine instance that is passed to block storage client and exposed as Xen Block Devices in Dom0. It is subsequently passed via network links to the master server 410. In some embodiments there may be one or more log drives configured to store the data before the data is actually flushed to the data volume for a write operation. The data can then be read from either the logical data volume or memory cache as any conventional Linux block device. Each master server 410 has a slave server 412 that is configured as a mirrored pair. All writes are sent to the master, and then from the master to the slave server, before returning the acknowledgement back to block storage client. All read requests are processed using data from the master server 410 only. As a result, user data is duplicated, or mirrored, between the logical volume on the master server and the corresponding volume on the slave server. When a fault occurs on the master server, the slave server 412 takes over the operation to interact with the block storage client. A new slave server is picked for each volume served on the old master server. The data is copied from the logical volume of the former slave to the logical volume of the new slave through a re-mirroring process. If a fault occurs on the new master before the re-mirroring has completed, volume data may be lost and not retrievable.

Accordingly, approaches in accordance with various embodiments can attempt to virtualize the storage volume such that the data stripes can be dynamically re-located without involving all the physical drives associated with the volume. Such an approach can alleviate the re-mirroring overhead that can be a cause of a significant number of issues relating to storage in a shared resource environment. A RAID-0 volume interface can be virtualized to allow for dynamic relocation of disk stripes based on runtime availability or performance characteristics of the storage host. As mentioned, a logical volume can be a Linux-based logical volume built on top of a set of physical drives, such as SSDs, installed on a master server host as a RAID-0 device. User write I/Os can first be written to one or more log drives, then later flushed to the logical volume as the final data storage destination. User read I/Os can be taken from memory cache or read directly from the logical volume.

Figure 5:
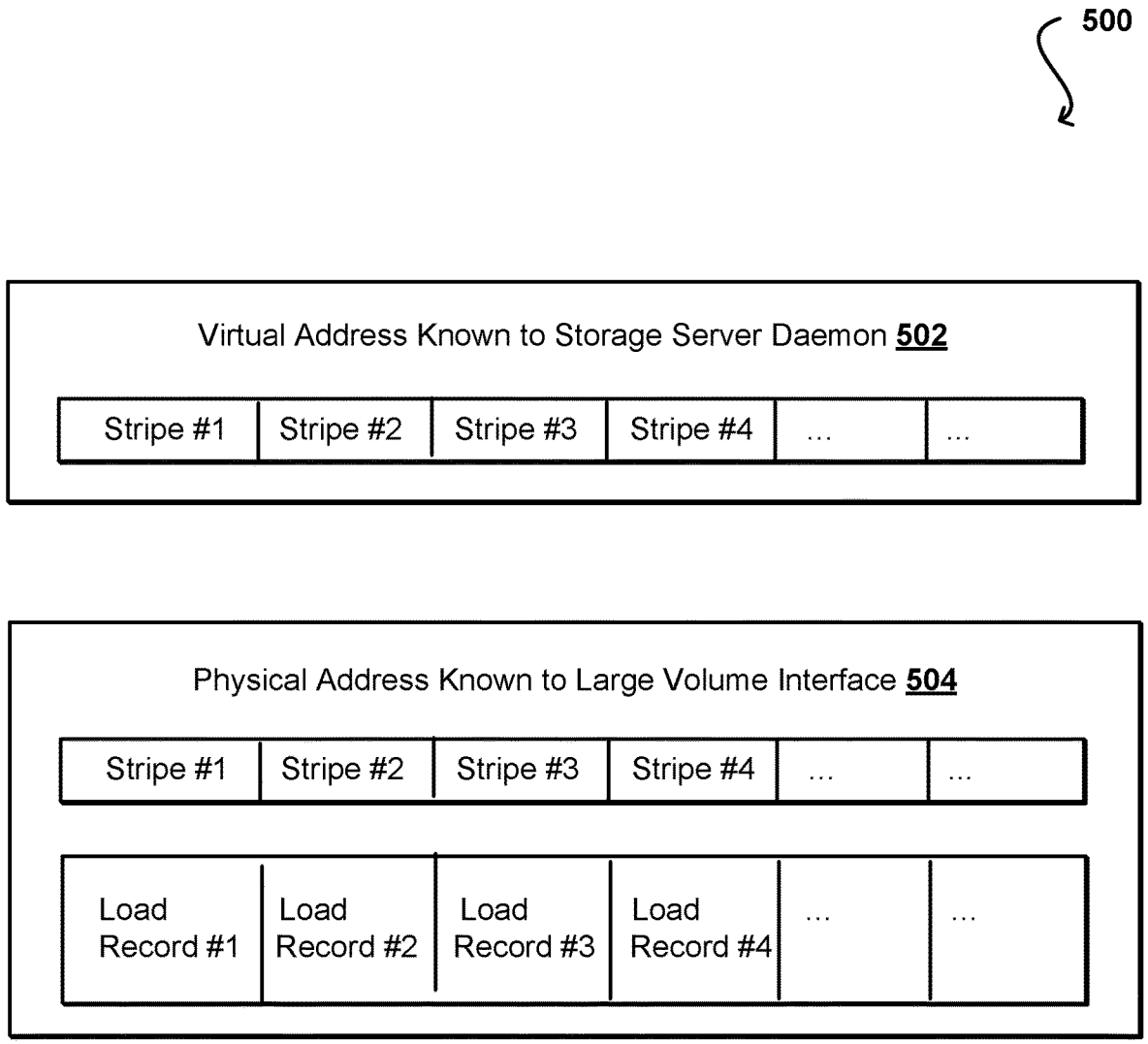
FIG. 5 illustrates an example translation table that can be utilized in accordance with various embodiments.

One approach to reducing the RAID-0 inefficiency is to virtualize the block addresses, as illustrated in the example translation table 500 of FIG. 5. In this example, a thin translation layer is built to convert the virtual block addresses 502 known to the storage server daemon into the physical block addresses 504 known to the RAID-0 interface. This can be in addition to, or part of, a remapping of an existing address map for the volume. Such a virtualization can enable the stripes or groups of blocks to be dynamically moved around amongst the various storage devices as needed. The translation table can also include entries on the I/O loads for movement scheduling. New stripe mapping can be performed based on various criteria, such as may be based upon first-found-least-load or next-to-buddy-stripe approaches. As discussed, a shared range lock can be utilized for a read request in some embodiments, while in others the data may be obtained before any remapping. The byte-addressable range, matching with the actual I/O request, can be a subset of the stripe or the stripe as a whole. If the disk that hosts the stripe is identified as unavailable or slow, for example, the shared range lock can be upgraded into an exclusive stripe shared lock, or similar such option. The stripe can then be read from the paired slave host, with the user data subsequently returned to the caller while the execution unit waits for the new write to complete. Before the lock is released, all reads into this stripe range are allowed and a write is allowed if the byte range data has been read in from the slave.

The flow for a write operation can be similar. In some embodiments an exclusive range lock can be put in place upon receiving a write request. The byte-addressable range can be a subset of the stripe or the entire stripe itself. If the disk that hosts the stripe is identified as unavailable or slow, for example, the range lock is upgraded into a restricted stripe write lock. The user data is written as usual, and an acknowledgement can be sent back to the caller. A remainder of the stripe data can subsequently be read from the paired slave, followed by a write to the local alternative disk. Before the lock is released, all reads into the stripe other than for the user write range can be allowed, and a write operation can be allowed if the byte range data has been obtained from slave server.

Thus, during normal operation there can be two servers, a master and slave, which in some embodiments can have identical disk configuration and storage patterns. Whenever a user writes to the volume, the disk and stripe used to write that data to the master volume can have a similar stripe written to the slave volume in order to create a redundant copy. If disk three on the master server dies, instead of taking the master server offline and generating a new copy of the entire data volume, the slave copy of the data for disk three can be used to write that data to stripe locations on the remaining active disks of the master server. The master server will continue to function as normal for purposes of the client application, but will operate with one less disk or storage device available. The data from the slave drive can be written to any of the available disks on the master. In at least some embodiments, the data written from the slave copy can be relatively spread out, or evenly apportioned, across some or all of the remaining disks of the master server. Based on the virtualization and translation table, the customer application or client device can still write as if disk three is active and the stripes are in their original location. An I/O manager can manage the conversion such that data is written to, and read from, the correct locations based on the conversion of the virtualized stripe address. A similar approach can be performed when the failed disk is on the slave server. The master can maintain its stripe addresses and the client can write directly to the stripe address. When copying the data to the slave, however, a translation layer can be used to indicate the actual locations where the data will be stored on the slave. For new writes in mirrored embodiments, the data can be written on the master to places that are also available on the slave, or the data can be written to the next ordered stripe on the master and then a translation done to determine the next logical location to store the data on the slave server.

Figure 6:
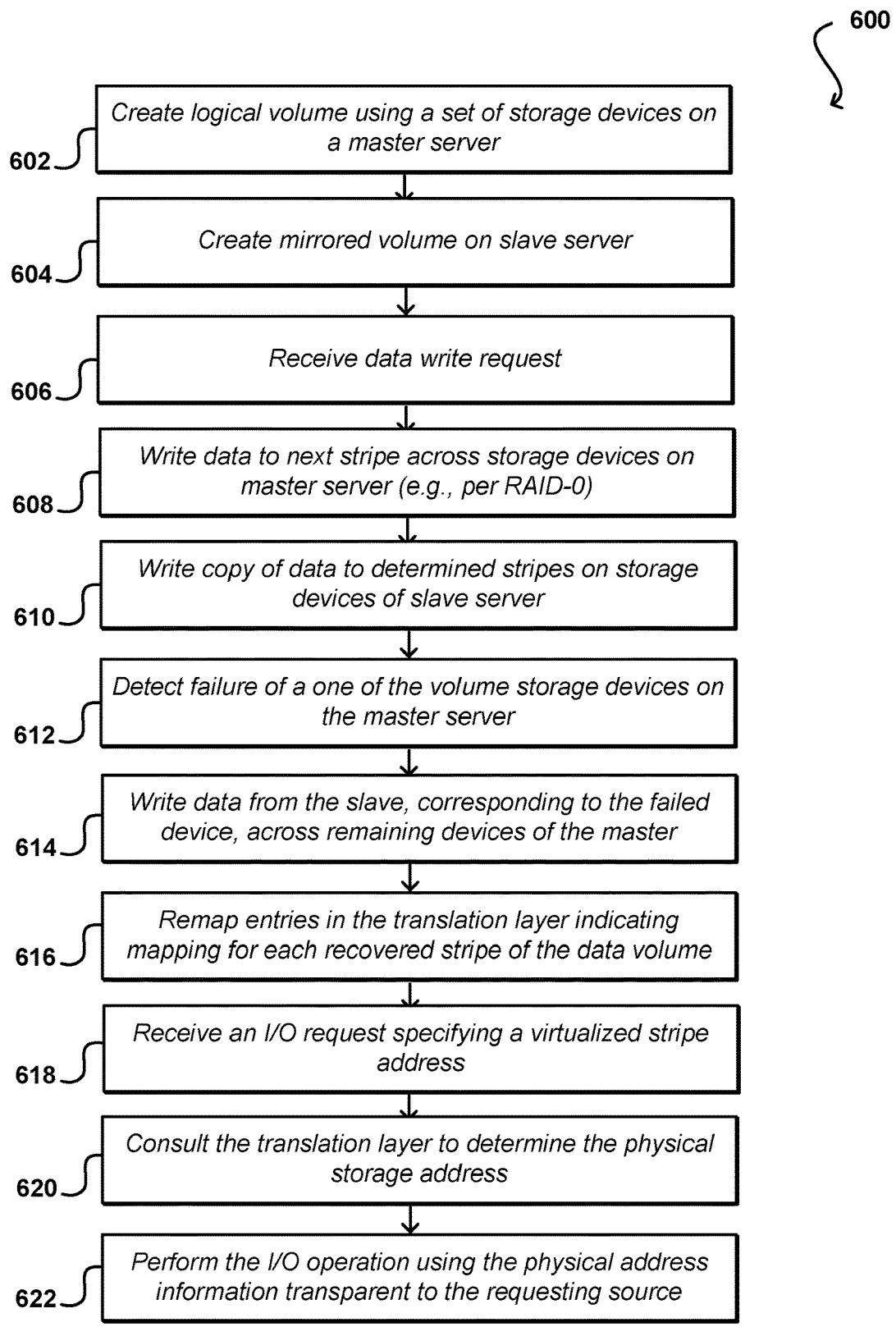
FIG. 6 illustrates an example process for recovering from a master disk failure that can be utilized in accordance with various embodiments.

FIG. 6 illustrates an example process 600 for managing a loss of a storage device on a master server for a redundant logical volume that can be utilized in accordance with various embodiments. It should be understood for the various processes described herein, however, that additional, fewer, or alternative steps can be performed in similar or alternative orders, or in parallel, within the scope of the various embodiments unless otherwise stated. In this example, a customer submits a request for storage capacity in a resource provider environment. Under the terms of the customer account with the provider, the customer is able to obtain allocation of resources of at least one data server to host a data storage volume. In response to the request, a server can be selected from an allocable server pool and a logical volume can be created 602 using a set of storage devices on a master server. This can be all or part of the devices on a server, such as may include allocated partitions on each disk if multiple volumes are to be hosted on the server. The storage devices can include any appropriate devices as discussed herein, as may include magnetic or solid state storage, among other such options. In order to create the volume, the data can be written to stripes across the storage devices of a master server using an appropriate striping approach, such as RAID-0. In order to provide for data redundancy, a slave volume can be created 604 on a slave server, also selected from the server pool, where the locations and stripes used to store the replicated data can mirror those of the master server in some embodiments, such that the slave server data partition is a mirror image of the partition on the master server, at least to the extent that there may be differences due to the partitions being on different physical devices. In other embodiments the slave server (or multiple slave servers) can store a redundant copy using an approach that is not a mirror of the master volume. Once the data volume is available, a write request can be received 606 on behalf of the customer and data for that request can be written 608 to the next available stripe(s) across the storage devices of the master server per the RAID-0 configuration. A copy of the data can also be caused to be written 610, from the master copy or local cache, for example, to the determined stripes of the storage devices of the slave server, such that the slave volume on the slave server remains an up-to-date copy of the master volume on the master server.

Subsequently, a failure (or other availability issue) can be detected 612 with respect to one of the storage devices on the master server. Failures or availability issues can include, for example, unavailability, communications errors, data storage and retrieval errors, unacceptable performance, and the like. In response, a recovery process can be initiated by a block storage manager or other such system or service. In some embodiments, a translation layer can be initialized for the data volume that can be used to virtualize the RAID addresses used by the client device. This can include, for example, maintaining the stripe ordering but mapping the virtualized strip locations to actual physical locations on the remaining storage devices of the master that can be used to store the recovered data that was previously stored on the failed storage device. In other embodiments, the mappings for the individual servers can be used to track the transitions. Once available, the recovery process can include writing 614 data from the storage device of the slave server, corresponding to the failed master device, across the remaining storage devices of the master server. As discussed, this can continue to use a striping approach, and can distribute the data relatively evenly across some or all of the remaining storage devices of the master. Entries for the newly written stripes for the recovered data can be generated or remapped 616 in the translation layer, indicating the physical address of the master device storing the data and the virtualized RAID address to be used by the client device to access the data. As mentioned, from the perspective of the client device the server is functioning as normal and there are no changes in address or stripe information that need to be managed by the customer or client device. The process can continue until all data previously located on the failed storage device is written to a new location on the master server and its address information stored to the translation layer. When an I/O request is subsequently received 618 with respect to the data volume, the translation layer can be consulted 620 by a component such as a block data storage manager, or other such system or service, to determine the corresponding physical address on the master server and perform 622 the I/O using the physical address information transparent to the requesting source, such as the client device associated with the customer that submitted a request using the RAID address information. Such an approach can be used to virtualize the RAID-0 volume interface to allow for a dynamic relocation of disk stripes based on runtime availability or performance characteristics of the storage host.

Figure 7:
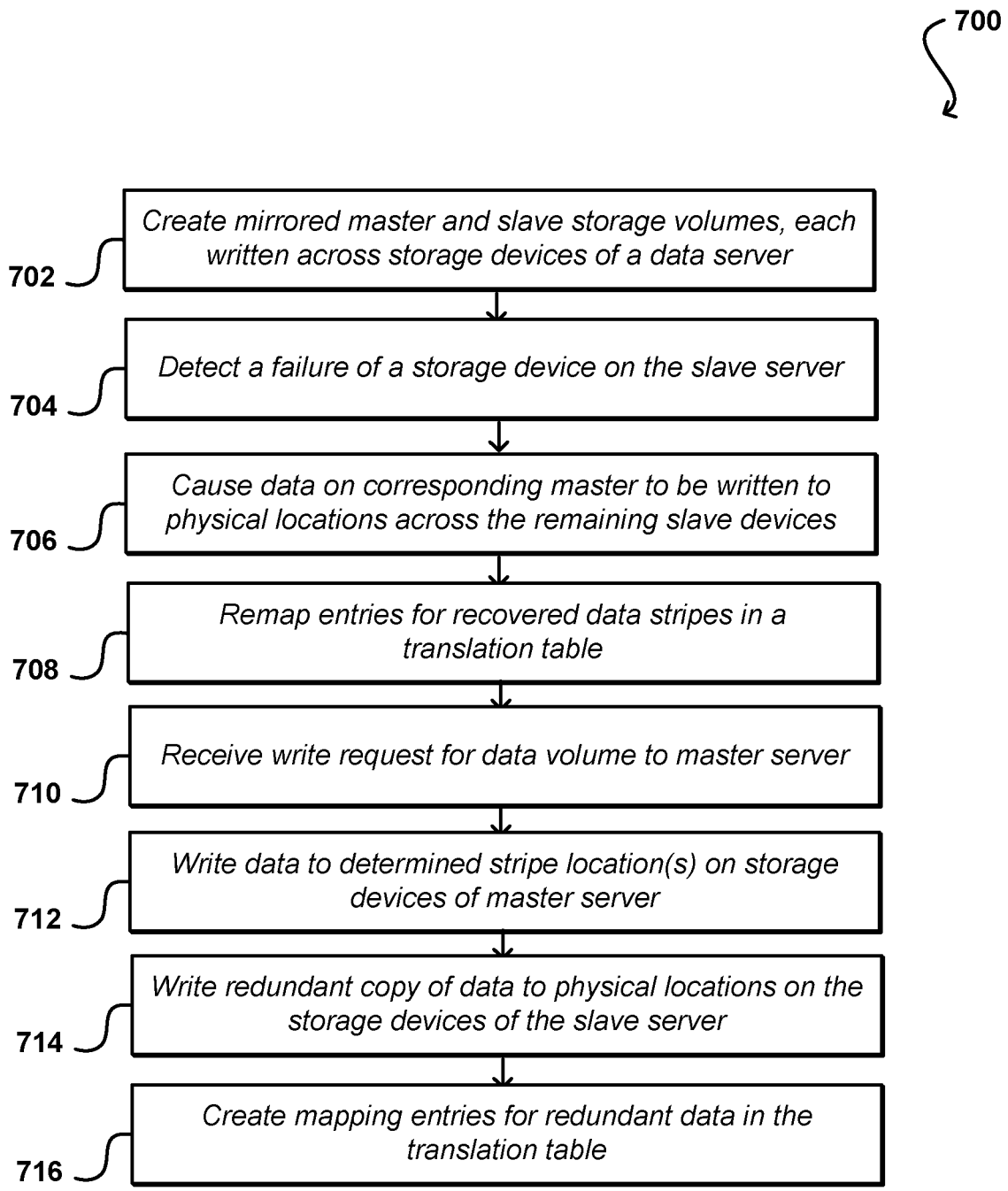
FIG. 7 illustrates an example process for recovering from a slave disk failure that can be utilized in accordance with various embodiments.

FIG. 7 illustrates an example process 700 for recovering from the failure of a storage device on a slave server that can be utilized in accordance with various embodiments. In this example, a redundant storage volume is created 702 on master and slave servers using a process such as that described with respect to FIG. 6, wherein the data is written across various storage devices of the servers. In this example, however, the failure (or performance issue) with a storage device is detected 704 on the slave server. Since the storage devices of the master server are not impacted, the master server does not need to change storage locations and can continue to process I/O requests in at least some embodiments. The failure of a slave storage device, however, means that the redundant copy of the data previously stored to that device must be written elsewhere in order to maintain a redundant copy of the storage volume.

Accordingly, data on the master storage device that corresponds to the failed slave device (e.g., drive 3 of 18) can be caused 706 to be written to physical locations across some or all of the remaining storage devices of the slave server. As mentioned, a stripe approach can be used based on the remaining devices, among other such approaches. Entries for the newly-located redundant data on the slave server can be created or remapped 708 in a translation table, server-specific mapping table, or other such mechanism, that maps the virtualized storage addresses (e.g., RAID stripe location information from the master) to the physical storage addresses on the remaining storage devices of the slave server. When a write request is subsequently received 710 to the master server for the data volume, the data can be written 712 to the determined stripe(s) of the master storage devices as discussed previously. In other embodiments, however, the data can be written to locations that will correspond to the slave locations, in order to retain mirrored copies. A redundant copy of the data can also be written 714 to the remaining storage devices of the slave server, and appropriate mapping entries can be generated in the translation table as appropriate, such that if the master server fails the slave can take over as the new master using the information in the translation table. A redundant copy of the data can also be written 714 to the remaining storage devices of the slave server, and appropriate mapping entries can be generated 716 in the translation table as appropriate, such that if the master server fails the slave can take over as the new master using the information in the translation table.

Figure 8:
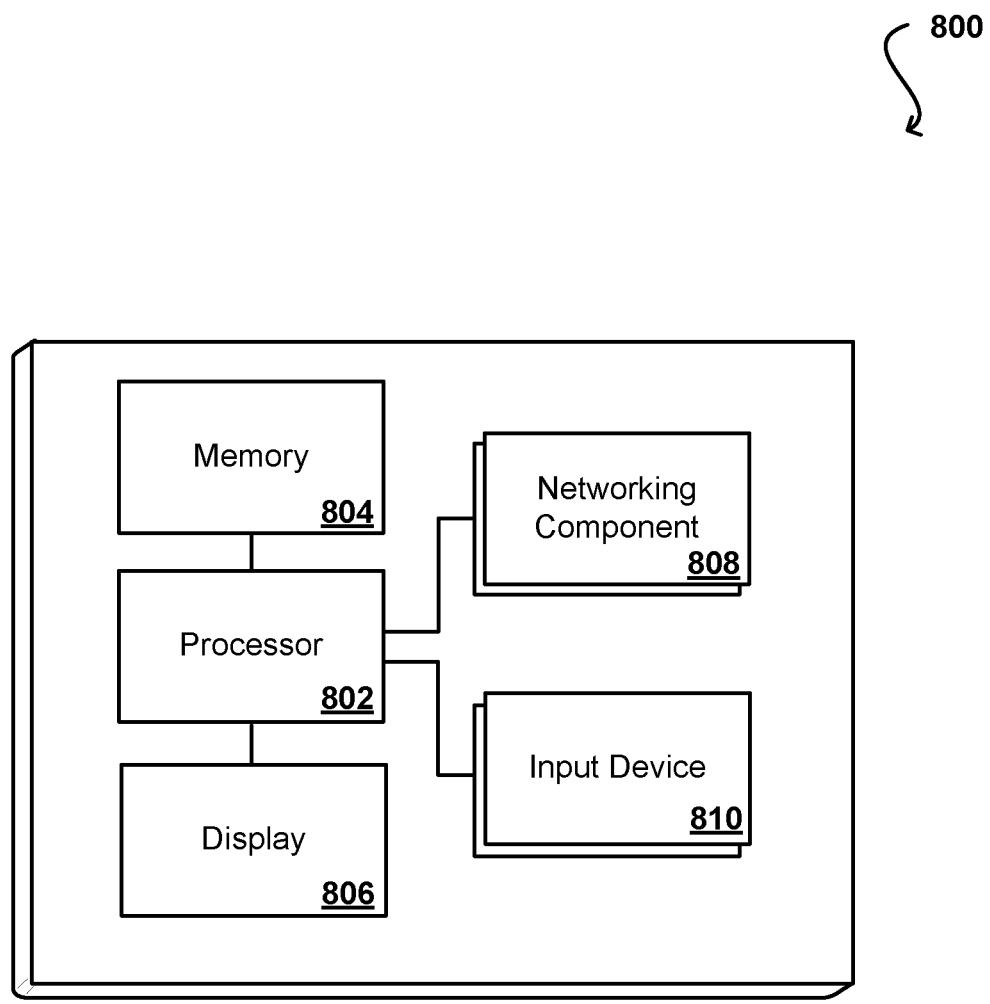
FIG. 8 illustrates components of an example computing device that can be utilized to perform aspects of the various embodiments.

FIG. 8 illustrates a set of basic components of an example computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C#or C++ or any scripting language, such as Perl, Python or TCL, as well as combinations thereof. The server(s) may also include database servers, including without limitation those commercially available from Oracle, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, include volatile memory and non-volatile memory, removable and non-removable media for storage of information such as computer readable instructions, data structures, program modules or other data, including RAM, ROM, EEPROM, flash memory or other memory technology, CD-ROM, digital versatile disk (DVD), magnetic cassettes, magnetic tape, or magnetic disk storage.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    detecting an issue with a storage device of a first set of storage devices, the first set of storage devices having collectively stored thereon a replica of a data volume;
    causing first data corresponding to a portion of the data volume previously written to the storage device to be stored across one or more other devices of the first set of storage devices; and
    mapping virtual block addresses for the first data to physical addresses on the one or more other devices of the first set of storage devices on which the first data is stored.

2. The computer-implemented method of claim 1, further comprising:
    receiving an access request for a subset of the data volume, the access request specifying a virtual block address;
    accessing the mapping to determine the corresponding physical address for the subset of the data volume; and
    providing the access to the subset of data at the corresponding physical address, wherein the request can specify the virtual block address independent of the actual physical address where the subset of the data volume is currently stored.

3. The computer-implemented method of claim 1, wherein the replica is designated as primary replica and a second replica is designated as a secondary replica, the secondary replica stored on a second set of storage devices, and wherein the first data is written to the one or more other devices from the secondary replica.

4. The computer-implemented method of claim 3, further comprising:
    detecting an issue with a device of the second set of storage devices;
    causing second data corresponding to a portion of the data volume previously stored on the second device, to be written from the primary replica to one or more other devices of the second set of storage devices on the secondary server; and mapping second virtual block addresses for the second data to physical addresses on the one or more other devices of the second set of storage devices on which the second data is stored.

5. The computer-implemented method of claim 1, further comprising:
determining that the one or more other storage devices of the first set of storage device lack sufficient capacity to store the first data and maintain a threshold amount of available capacity; and
causing a new set of storage devices to be allocated to store the replica.

6. The computer-implemented method of claim 1, further comprising:
placing an address range lock on at least a subset of the first data corresponding to the storage device until the first data is written back to the one or more other devices of the first set of storage devices.

7. The computer-implemented method of claim 1, wherein the replica is striped across the first set of data storage devices using a data placement algorithm associated with a RAID-0 methodology.

8. A system, comprising:
at least one processor; and
memory including instructions that, when executed by the at least one processor, cause the system to:
detect an issue with a storage device of a first set of storage devices, the first set of storage devices having collectively stored thereon a replica of a data volume;
cause first data corresponding to a portion of the data volume previously written to the storage device to be stored across one or more other devices of the first set of storage devices; and
map virtual block addresses for the first data to physical addresses on the one or more other devices of the first set of storage devices on which the first data is stored.

9. The system of claim 8, wherein the instructions when executed further cause the system to:
receive an access request for a subset of the data volume, the access request specifying a virtual block address;
access the mapping to determine the corresponding physical address for the subset of the data volume; and
provide the access to the subset of data at the corresponding physical address, wherein the request can specify the virtual block address independent of the actual physical address where the subset of the data volume is currently stored.

10. The system of claim 8, wherein the replica is designated as primary replica and a second replica is designated as a secondary replica, the secondary replica stored on a second set of storage devices, and wherein the first data is written to the one or more other devices from the secondary replica.

11. The system of claim 10, wherein the instructions when executed further cause the system to:
detect an issue with a device of the second set of storage devices;
cause second data corresponding to a portion of the data volume previously stored on the second device, to be written from the primary replica to one or more other devices of the second set of storage devices on the secondary server; and
map second virtual block addresses for the second data to physical addresses on the one or more other devices of the second set of storage devices on which the second data is stored.

12. The system of claim 8, wherein the instructions when executed further cause the system to:
determine that the one or more other storage devices of the first set of storage device lack sufficient capacity to store the first data and maintain a threshold amount of available capacity; and
cause a new set of storage devices to be allocated to store the replica.

13. The system of claim 8, wherein the instructions when executed further cause the system to:
place an address range lock on at least a subset of the first data corresponding to the storage device until the first data is written back to the one or more other devices of the first set of storage devices.

14. The system of claim 8, wherein the replica is striped across the first set of data storage devices using a data placement algorithm associated with a RAID-0 methodology.

15. A non-transitory computer-readable storage medium storing instructions that, when executed by one or more processors of a computing system, cause the computing system to:
detect an issue with a storage device of a first set of storage devices, the first set of storage devices having collectively stored thereon a replica of a data volume;
cause first data corresponding to a portion of the data volume previously written to the storage device to be stored across one or more other devices of the first set of storage devices; and
map virtual block addresses for the first data to physical addresses on the one or more other devices of the first set of storage devices on which the first data is stored.

16. The non-transitory computer-readable storage medium of claim 15, wherein the instructions when executed further cause the computing system to:
receive an access request for a subset of the data volume, the access request specifying a virtual block address;
access the mapping to determine the corresponding physical address for the subset of the data volume; and
provide the access to the subset of data at the corresponding physical address, wherein the request can specify the virtual block address independent of the actual physical address where the subset of the data volume is currently stored.

17. The non-transitory computer-readable storage medium of claim 15, wherein the replica is designated as primary replica and a second replica is designated as a secondary replica, the secondary replica stored on a second set of storage devices, and wherein the first data is written to the one or more other devices from the secondary replica.

18. The non-transitory computer-readable storage medium of claim 17, wherein the instructions when executed further cause the computing system to:
detect an issue with a device of the second set of storage devices;
cause second data corresponding to a portion of the data volume previously stored on the second device, to be written from the primary replica to one or more other devices of the second set of storage devices on the secondary server; and
map second virtual block addresses for the second data to physical addresses on the one or more other devices of the second set of storage devices on which the second data is stored.

19. The non-transitory computer-readable storage medium of claim 15, wherein the instructions when executed further cause the computing system to:

determine that the one or more other storage devices of the first set of storage device lack sufficient capacity to store the first data and maintain a threshold amount of available capacity; and cause a new set of storage devices to be allocated to store the replica.

20. The non-transitory computer-readable storage medium of claim 15, wherein the instructions when executed further cause the computing system to:

place an address range lock on at least a subset of the first data corresponding to the storage device until the first data is written back to the one or more other devices of the first set of storage devices.

* * * * *